(12) United States Patent
Schwalenberg et al.

(10) Patent No.: US 8,159,147 B2
(45) Date of Patent: Apr. 17, 2012

(54) LUMINOUS CHAIN WITH DISTRIBUTED DRIVER CIRCUIT

(75) Inventors: Simon Schwalenberg, Regensburg (DE); Harald Stoyan, Rettenbach (DE)

(73) Assignee: OSRAM AG, Munich (DE)

( * ) Notice: Subject to any disclaimer, the term of this patent is extended or adjusted under 35 U.S.C. 154(b) by 807 days.

(21) Appl. No.: 12/232,288

(22) Filed: Sep. 15, 2008

(65) Prior Publication Data

US 2009/0072760 A1    Mar. 19, 2009

(30) Foreign Application Priority Data

Sep. 14, 2007   (DE) .......................... 10 2007 043 862

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/00 | (2006.01) |

(52) U.S. Cl. .................... 315/294; 315/291; 315/312
(58) Field of Classification Search .................. None
See application file for complete search history.

(56) References Cited

U.S. PATENT DOCUMENTS

| | | | |
|---|---|---|---|
| 2003/0230991 A1* | 12/2003 | Muthu et al. .................. 315/307 |
| 2006/0284199 A1  | 12/2006 | Matheson |
| 2007/0046485 A1* | 3/2007  | Grootes et al. ........... 340/815.45 |
| 2007/0057638 A1* | 3/2007  | Lee et al. ...................... 315/194 |
| 2007/0153508 A1  | 7/2007  | Nall et al. |

FOREIGN PATENT DOCUMENTS

| | | |
|---|---|---|
| DE | 198 48 078 A1 | 4/2000 |
| DE | 200 07 281 U1 | 9/2000 |
| DE | 100 51 528 A1 | 5/2002 |
| DE | 101 25 852 A1 | 12/2002 |
| DE | 102 36 862 A1 | 3/2004 |
| EP | 1 519 106 A2 | 3/2005 |

* cited by examiner

*Primary Examiner* — Douglas W Owens
*Assistant Examiner* — Dedei K Hammond

(57) ABSTRACT

The luminous chain includes a plurality of luminous modules, wherein at least two of the luminous modules include at least one set including at least one light source and one driver circuit for driving the at least one light source, and the driver circuits of one set of the respective luminous modules are electrically connected in parallel with one another, and the light sources of the one set of the respective luminous modules are electrically connected in series with one another, and the driver outputs of the driver circuits are combined at a node for jointly supplying current to all of the light sources of the one set.

18 Claims, 5 Drawing Sheets

LUMINOUS CHAIN WITH DISTRIBUTED DRIVER CIRCUIT

The invention relates to a luminous chain comprising a plurality of luminous modules, a luminous module for use in a luminous chain, and a method for operating a luminous chain.

Luminous chains comprising a plurality of luminous modules have hitherto comprised a driver circuit for driving or supplying current to light emitting diodes (LEDs) present on the luminous modules, said driver circuit being accommodated on an additional, non-luminous module, which is comparatively complicated and requires space. As an alternative, the one driver circuit can be accommodated on one of the luminous modules; however, this has the effect that the heat distribution over the individual luminous modules is non-uniform, which leads to fluctuations in the optical parameters. As an alternative, the driver circuit can be accommodated in an external unit, as this is likewise comparatively complicated and requires space. A further way of driving the LEDs can be achieved by electrically connecting the LEDs in parallel, which enables a merely comparatively non-uniform driving of the LEDs.

The object of the present invention is to provide a possibility for driving light sources of luminous modules which is comparatively space-saving and cost-effective and has little influence on the optical parameters of the light sources.

The object is achieved by means of a luminous chain according to claim 1 or 3, a luminous module according to claim 2, and a method according to claim 13.

According to one aspect, the luminous chain comprises a plurality of luminous modules, wherein at least two of the luminous modules are equipped with at least one set comprising at least one light source and a driver circuit for driving, in particular supplying current to, the at least one light source. The driver circuits of one set of the respective luminous modules are electrically connected in parallel with one another. By contrast, the associated light sources are electrically connected in series with one another. The driver outputs of the above driver circuits are combined at a node for jointly supplying current to all of the associated light sources. By virtue of this uniform distribution of the driver circuits among the luminous modules, being electrically interconnection in parallel, and subsequent passing of the summation current output by the driver (partial) circuits through the series-connected light sources, the device can be constructed simply and cost-effectively without further assemblies (external driver units, dedicated modules), and a power loss dissipated as heat can be uniformly distributed among all of the luminous modules configured in this way, which produces a substantially heat-loss-independent luminous characteristic.

The luminous module, suitable in particular for use in the luminous chain, comprises at least one continuous light-source line with at least one interposed light source, in particular with at least one light emitting diode. Continuous is understood to mean here in particular an electrical line which comprises at least one input terminal and one output terminal at the luminous module, that is to say is led through the luminous module. The luminous module furthermore comprises at least one continuous light source supply line for supplying power to the light source, and at least one continuous driver supply line for operating at least one driver circuit serving for driving at least one light source. A driver circuit feeds the at least one continuous driver supply line.

According to another aspect, the luminous chain comprises a plurality of cascaded luminous modules of the above type wherein, in at least one luminous module, in particular a terminally situated luminous module, the light source supply line and the light source line are electrically connected to one another. In this luminous module, the (accumulated) summation current of the driver (partial) circuits that is passed via the light source supply line is thereby fed into the light sources connected in series in the light source line.

It is advantageous if the driver circuit comprises an electrical resistor and/or at least one transistor and/or at least one diode. It is furthermore advantageous if the driver circuit is a current control circuit, in particular a current stabilizer circuit. The driver output, in particular for driving LEDs, is advantageously, but not necessarily, a current output. For other light sources, the driver output may be configured for example as a power or voltage output.

It is advantageous for a simple construction if the driver circuit is electrically connected by one of its supply inputs to a cathode side of the associated light source, that is to say light source present on the same luminous module, since this results in a higher potential difference than in the case of connection to the anode side. However, it is also possible, in principle, to electrically connect the driver circuit to an anode side of the light source. It may alternatively also be advantageous if the driver circuit is connected to a dedicated driver supply line for each of its supply inputs.

For increasing the luminous intensity it may be advantageous if each luminous module comprises a plurality of light sources per set, in particular light emitting diodes having the same light spectrum, e.g. white or identically colored LEDs, in particular two green LEDs.

For, in particular flexible, color setting and/or for increasing the luminous intensity it is advantageous if each luminous module comprises a plurality of sets comprising at least one light source and a driver circuit for supplying current to the at least one light source. These interconnected sets are also called strands.

It is advantageous, in particular for variable setting of a color emission, if at least three sets comprising at least one light source and an associated driver circuit are present (corresponding to at least three strands), wherein the light sources of at least two sets or strands are in each case of different colors with respect to one another.

It is advantageous for setting a white color emission if the light sources of a luminous module emit at least with colors which enable such a white additive color mixing, in particular of the colors RGB, especially RGGB. This may correspond to the presence of at least one R, G and B strand, in particular one red strand, two green strands and one blue strand, or a multiple thereof.

Preferably, the luminous module comprises a heat sink. As a result of the heat sink being integrated into the luminous module, the latter is cooled better, whereby an outputting of light becomes more uniform and, in addition, a service life is lengthened. Furthermore, a user need no longer be concerned, or no longer be concerned as intensively, with the cooling of a luminous chain, whereby user friendliness is increased. This holds true particularly when the luminous chain is accommodated in a so-called light box, which results in a uniform backlighting of luminous areas (e.g. advertising boxes or luminous letters) with improved optical properties and improved and simplified cooling and thus increased reliability.

Preferably, the luminous sources are arranged on a front side of a circuit board, and the heat sink is connected to a rear side of the circuit board.

Preferably, the heat sink is fixed to the circuit board by means of an adhesive means. The adhesive means is preferably a thermally conductive adhesive connection and can be electrically conductive or insulating, as required. As an alternative, the heat sink can be fixed to the circuit board by means of a mechanical connecting element, wherein an interlayer of TIM material is preferably arranged between the heat sink and the circuit board.

A luminous module in which the heat sink comprises holding lugs for fixing the luminous module is preferred. In this case, the heat sink is preferably embodied in an elongate shape. The shape of the heat sink preferably corresponds to the circuit board dimensions. The holding lugs then preferably start at a side edge in the region of the center of the associated longitudinal axis. The elongate shape used can be for example an oval, a polygonal or a rectangular basic shape, or mixed shapes thereof, wherein the contour of the side edges can deviate locally therefrom. However, heat sink and/or circuit board are not restricted to an elongate shape, but rather can be shaped as desired, e.g. in a round or square shape. Moreover, the holding lugs can be situated at any desired position.

For effective cooling, the heat sink preferably comprises a pad composed of cooling pins, wherein, even more preferably, the height of the holding lugs is less than the height of the pins. A luminous module in which the holding lugs and the pins exhibit a height difference of between approximately 0.05 and approximately 0.3 mm is particularly preferred.

Furthermore, a luminous module in which the heat sink is composed of aluminum, in particular of aluminum having a degree of purity above 95%, especially of above 98%, is preferred. Generally, the heat sink can be composed of a material having a high thermal conductivity, e.g. using copper, zinc and/or magnesium. Specifically, the heat sink comprises a pad composed of regularly arranged pins having the same height, said pad being placed on a plate.

The heat sink is preferably surface-treated, e.g. coated or anodically oxidized, in order to increase the thermal emittance.

In order to improve the optical properties and the heat emission, the heat sink exhibits a light color with a high light reflectance.

The luminous sources are preferably light emitting diodes, but can also comprise different luminous means such as incandescent lamps, fluorescent lamps, compact discharge lamps and so on.

The luminous module may comprise a common optical unit, in particular diffusing optical unit, e.g. a common diffusing lens, for some or all of the luminous sources mounted on it. In order to reduce the installation height, however, it is particularly preferred if each luminous source is assigned a dedicated diffusing optical unit for diffusing the light emitted by the respective luminous source, in particular a wide emitting lens, such as a so-called ARGUS-Lens. Any other suitable light diffusing element can also be used instead of a diffusing lens.

A coupling-out optical unit can also be used for increasing the efficiency.

A luminous module in which the circuit board or the substrate or the construction technology exhibits a good thermal conductivity or low thermal resistance is preferred. A luminous module in which the circuit board is a metal-core circuit board is particularly preferred.

It is preferred if the luminous module comprises a cover at least for covering the circuit board. In order to improve the uniformity of a light emission, in particular from light boxes, the cover exhibits externally a reflectivity of more than 60% in the visible range of light. In this case, it is preferred for the cover to be embodied in such a way that it at least partly laterally covers the heat sink in the emplaced state. The cover can be composed of plastic or metal. It may be preferred, particularly in the case of a use in interior spaces, if the cover in the emplaced state does not close off an underlying interior space of the luminous module in an airtight manner. Advantageously, for mechanical protection and for corrosion protection, electrical contacts of current-carrying parts on the circuit board are then coated with a lacquer layer, in particular with a lacquer having a viscosity in the range of 100-3000 mPas during application, in order to be able to be distributed with uniform coverage.

The object is also achieved by means of a luminous chain comprising at least two series-connected luminous modules of the above type.

In the method for operating a luminous chain, wherein the luminous chain comprises a plurality of luminous modules each comprising at least one set comprising at least one light source and a driver circuit for driving the at least one light source:
  the driver circuits of one set of the respective luminous modules are supplied with current electrically in parallel, and
  the currents of the driver circuits of said one set of luminous modules for supplying the light sources are combined at a node, and
  the light sources of said one set of the respective luminous modules are supplied with the combined currents of the driver circuits electrically in series.

The invention is explained in more detail below schematically on the basis of exemplary embodiments. In this case, for clearer illustration, identical components or components of identical type may be designated by identical reference signs. For better clarity, electrical inputs and outputs are not depicted specially or provided with reference signs; however, they are present in an obvious manner to the person skilled in the art from the figures. It should additionally be clear that the exemplary embodiments are not intended to restrict the invention.

FIG. 1 schematically shows a luminous chain comprising a plurality of luminous modules in accordance with a first embodiment;

FIG. 2 schematically shows a luminous module in accordance with a further embodiment;

FIG. 3 schematically shows a luminous module in accordance with yet another embodiment;

FIG. 4 schematically shows a luminous module in accordance with yet another embodiment;

FIG. 5 schematically shows a luminous chain comprising a plurality of luminous modules in accordance with a further embodiment;

Figure 1:
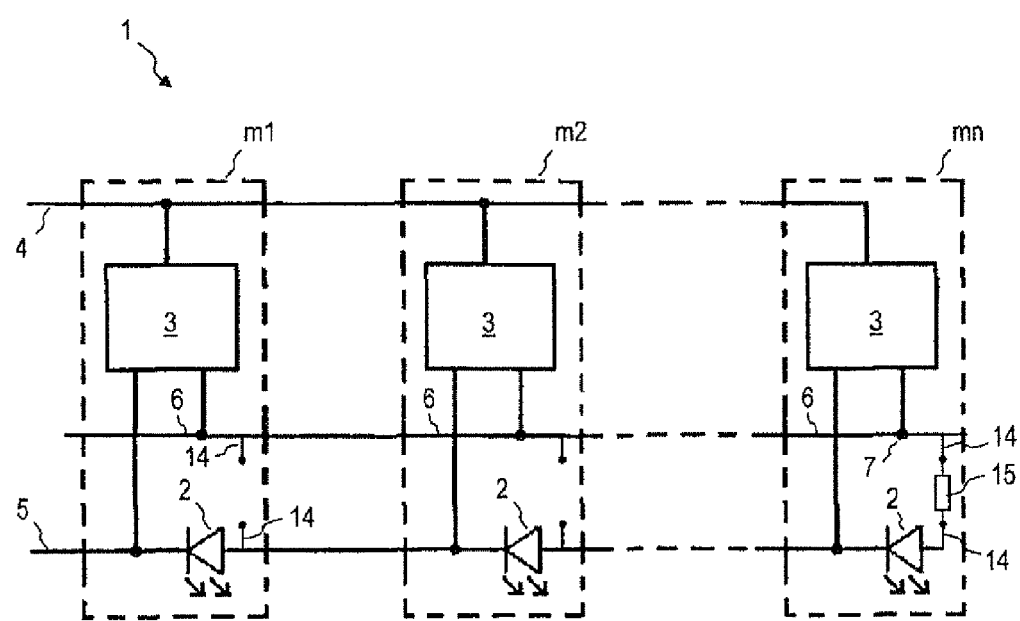

FIG. 1 shows a luminous chain 1, e.g. for backlighting luminous zones, comprising a plurality of n serially interconnected luminous modules m1, m2, . . . , mn. The luminous modules exhibit the same structural basic construction. Each of the luminous modules m1, m2, . . . , mn comprises a light emitting diode 2 and an LED driver circuit in the form of a current control circuit 3 for supplying current to the light emitting diode(s) 2. The current control circuit 3 is attached electrically between two respectively continuous driver supply lines 4, 5. One of these supply lines 5 corresponds to a continuous light source line 5 in which the LED 2 is interposed. In the embodiment shown, the current control circuit 3 is electrically connected by one of its supply inputs to a cathode side of the associated LED 2. By virtue of the tapping off of the required voltage potential—which is lower here in comparison with the driver supply line 4—at the cathode of the LED 2 positioned on the respective luminous module m1, m2, . . . , mn, a connecting line between the luminous modules m1, m2, . . . , mn is advantageously saved.

Driver outputs of the control circuit 3 are in each case electrically connected to a continuous light source supply line 6. On the luminous modules m1, m2, . . . , mn-1, the driver outputs are not led to the LED 2, but rather are connected via the light source supply line 6. It is only on the last, that is to say terminally situated, luminous module mn that the light source supply line 6 is electrically connected to the light source line 5.

In other words, the partial currents of the individual control circuits 3 electrically connected in parallel are all combined at a node 7 on the terminally situated luminous module mn and the summation current is then conducted through the series-connected LEDs 2.

The luminous module mn in which the light source supply line 6 is electrically connected to the light source line 5 can be derived for example from the basic form of the other luminous modules m1, m2, . . . by inserting a bridge 15 between contacts 14 of the light source supply line 6 and of the light source line 5 which are open in the basic form.

As an alternative, all of the luminous modules can correspond to the basic form with open contacts, wherein, for operation of the luminous chain, the free terminal of the light source supply line 6 of the terminally situated luminous module is electrically connected to the free terminal of the light source line 5. This variant has the advantage that the length of the luminous chain can be adapted flexibly and in the field and is essentially only limited by the maximum power consumption.

The luminous chain 1 shown has the advantage that, firstly, there is no need for a separate module for driving the light emitting diodes 2 and, secondly, on account of the distribution of the driver components among the individual luminous modules m1, m2, . . . , mn that are separated from one another at least thermally, but usually also spatially, the power loss which occurs and which is converted into heat is likewise distributed among the individual luminous modules m1, m2, . . . , mn. This leads to more homogeneous operating conditions of the individual LEDs 2. Power loss fluctuations that occur on account of fluctuations in the electrical parameters of the LEDs 2 therefore do not appear at points at a location, which advantageously attenuates a point-like heating and the influence thereof on the optical parameters of the LEDs 2.

The luminous module m1 can also be configured identically to the luminous module m2.

The electrical concatenation of LEDs 2 that is shown can also be referred to as a strand. The arrangement shown then corresponds in other words to an LED strand on the luminous chain 1 with a distributed driver circuit.

Figure 2:
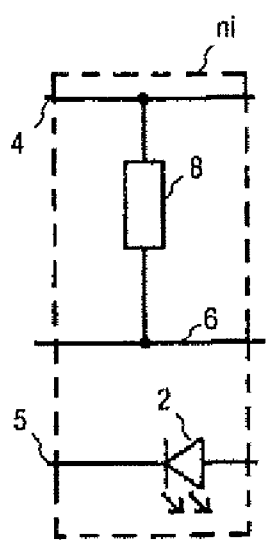
Figure 3:
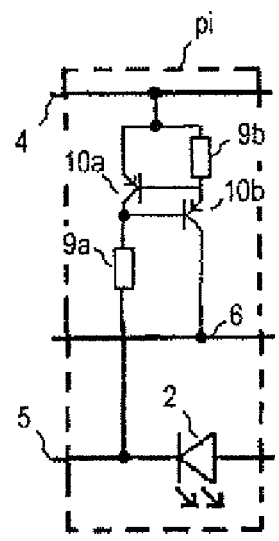
Figure 4:
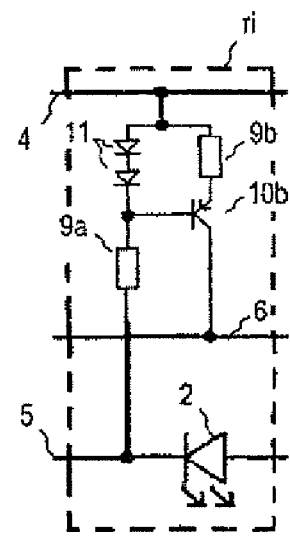

FIG. 2, FIG. 3 and FIG. 4 show luminous modules ni, pi, ri analogously to the luminous modules m2 from FIG. 1, in which the driver circuit 3 is now explained in greater detail.

FIG. 2 shows a luminous module ni in which the current control circuit or current stabilizer circuit only comprises a resistor 8. The latter is designed such that, as a result of the parallel connection and thus the reduction of the total resistance, the desired summation current is established at the combining node for a predetermined supply voltage.

FIG. 3 shows a further possible embodiment of a current control circuit or current stabilizer circuit of a luminous module pi, which also comprises pnp-transistors 10a, 10b in addition to resistors 9a, 9b. This circuit branches from the upper supply line 4 into a left branch ("base branch"), in which a transistor 10a and a resistor 9a ("base resistor") are connected in series as shown and which leads to the lower supply line 5, which corresponds to the light source line 5, and into a right branch, in which a resistor 9b and a transistor 10b are connected in series as shown and which leads to the light source supply line 6. The branches are coupled to one another by the base of the respective pnp-transistor 10a, 10b being coupled in between the transistor 10b, 10a and the resistor 9b, 9a of the respective other branch. Consequently the base of the transistor 10a of the left branch is electrically connected to the emitter terminal of the transistor 10b of the right branch. By contrast, the base of the transistor 10b of the right branch is electrically connected to the collector terminal of the transistor 10a of the left branch.

During operation, an LED supply (partial) current flows from the upper supply line 4 through the left branch or base branch through the transistor 10a and the resistor 9a since the base of the transistor 10a is driven via the resistor 9b of the right branch. Since a defined voltage is dropped across the transistor 10a, the base of the transistor 10b of the right branch is also driven, such that an LED supply (partial) current flows from the driver supply line 4 through the right branch to the light source supply line. The current gain can be set, inter alia, by the dimensioning of the base resistor 9a. The resistor 9b of the right branch is designed such that an n-th of the desired summation current is established as a result of the voltage drop that is fixed at the emitter-base junction of the transistor 10a.

FIG. 4 shows a further possible embodiment of a current control circuit or current stabilizer circuit of a luminous module ri, in which, now, in contrast to the embodiment of FIG. 3, two series-connected diodes 11 are present instead of the transistor 10a in the left branch. A constant voltage of, for example, 0.6 V to 0.7 volt is dropped in each case across the diodes 11, such that the base of the transistor 10b is at the corresponding voltage, e.g. 1.2 V to 1.4 volts. As a result, the current from the upper supply line 4 through the resistor 9b to the light source supply line 6 can be correspondingly kept constant.

Figure 5:
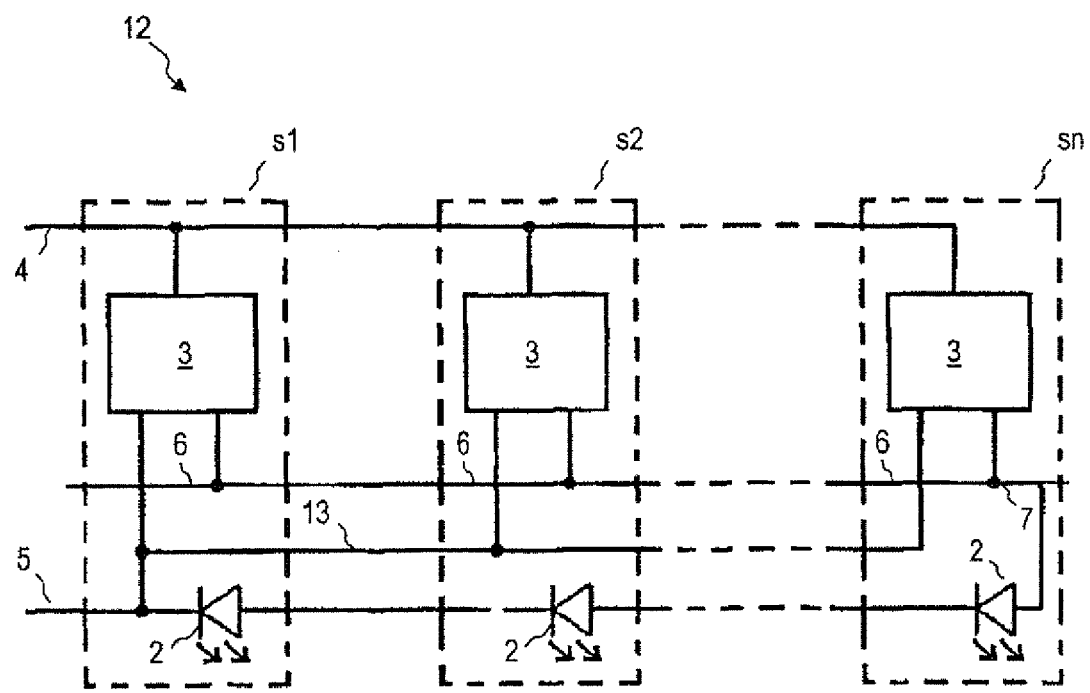

FIG. 5 shows a further exemplary embodiment of a luminous chain 12, in which, in contrast to the luminous chain 1 from FIG. 1, a dedicated driver supply line 13 is now present. Consequently, the light source line 5 no longer functions simultaneously as a driver supply line, but only serves for the serial connection of the LEDs 2. This embodiment variant has the advantage that the setting of the supply voltage for the driver circuit(s) is simpler, but requires an additional line in comparison with the luminous chain 1.

Figure 6:
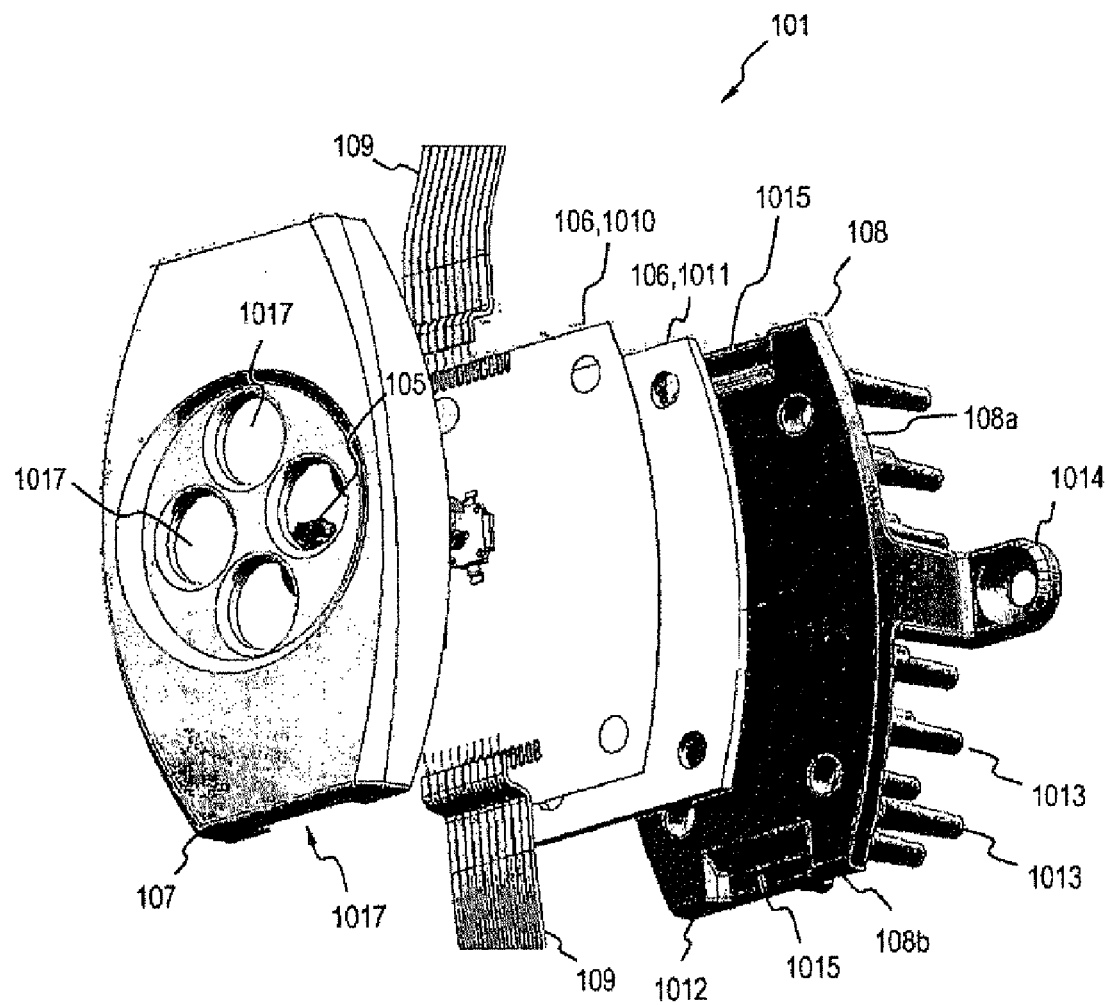
FIG. 6 shows a luminous module in an exploded view obliquely from the front.
Figure 7:
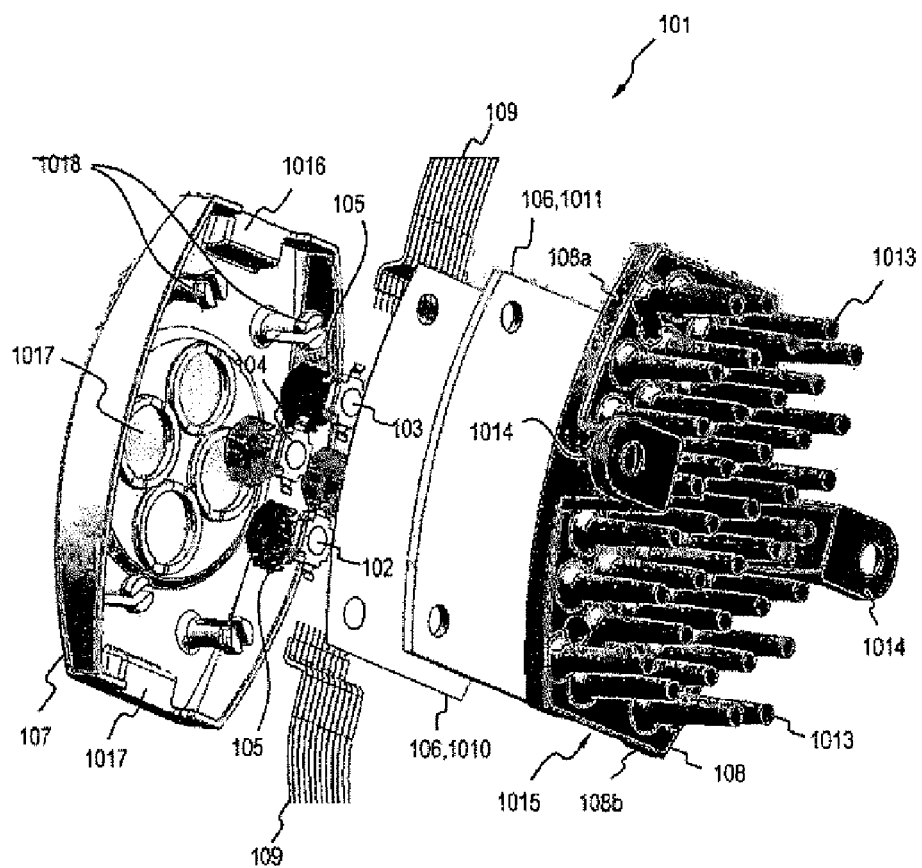
FIG. 7 shows the luminous module from FIG. 6 in an exploded view obliquely from the rear.

FIG. 6 and FIG. 7 in each case show a luminous module 101. In the embodiment shown, each module 101/element of the chain comprises a circuit board 106 populated with a plurality of LEDs 102, 103, 104 with respective diffusing optical units 105 arranged in the emission direction and with further electronic components, in particular driver circuits (not illustrated). A cover 107 and a heat sink 108 are situated on the front and rear side, respectively, of the circuit board 106.

In detail, one red LED 102, one blue LED 103 opposite the latter, and two green LEDs 104 (only one of which is illustrated) arranged adjacent thereto are used per module 101. As a result, the total luminous area of the LEDs is chosen to be larger for green than for red and blue (luminous area ratio green:red:blue=2:1:1). This has an advantageous effect on the color mixing for white light since the green proportion is particularly high for a white mixing. As a result, it is possible to use comparatively inexpensive LEDs 102, 103, 104 which, moreover, do not have to be driven up to their power limits. It is particularly suitable for this purpose to drive the LEDs 102, 103, 104 with a luminous proportion of green:blue:red of 60:30:10. Apart from white, all other possible color mixings can be produced by suitable driving of the LEDs 102, 103, 104 by means of a pulse-width-modulated supply current.

Along the chain, LEDs of identical color 102, 103, 104 are electrically connected in series (so-called "strands"), wherein two separate series circuits (that is to say two strands) are used for the color green. The current per strand is set by means of a parallel circuit of identically constructed driver circuits distributed among the individual luminous modules 101, which convert the excess power which may be different on account of the production-dictated different forward voltages of the LEDs 102, 103, 104, into heat. In this case, these components are arranged on the modules 101/circuit boards 106 of the chain in order to distribute the heat uniformly over the circuit boards 106, which leads to more homogeneous operating conditions of the individual modules 101.

The electrical connection is effected via a single- or multipole electrical line, e.g. the ribbon cable 109 shown, or by individual lines, each embodied as a litz wire or a solid wire, for example, which is connected to the circuit board 106. For supplying current to a further module (not illustrated), the current supply lines are looped through the circuit board 106 and lead as far as another cable terminal, from which in turn a cable 109 leads to the other module. These two cables 109 or electrically connected cable terminals are thus electrically connected to one another. However, just one current terminal suffices for supplying current to the module 101.

The LEDs 102, 103, 104 can be equipped with or without an attached diffusing optical unit 105 and can be present in housed form (LED chip in a housing) or an unhoused version (just the LED chip). In this embodiment, each of the LEDs 102, 103, 104 comprises an identical flat diffusing lens 105 exhibiting a wide emission angle. As a result, a possibility for comparatively uniform illumination in conjunction with wide viewing angles can be achieved using simple means. Moreover, the construction shown exhibits only a small structural height in the region of the luminous elements 102, 103, 104.

The circuit board 106 shown is a metal-core circuit board, comprising a structured copper layer on a dielectric 1010, e.g. composed of polyimide or epoxy resin, and also a substrate 1011, e.g. composed of aluminum, copper or some other metal. In this case, the heat generated on the circuit board 106 is emitted particularly effectively to the heat sink 108 via the large interface of said circuit board.

The heat sink 108 is preferably composed of a material having a high thermal conductivity, such as aluminum. As an alternative, it is also possible to use heat sinks 108 using copper, zinc and/or magnesium, or generally using materials having good conductivity, such as metals. The heat sink 108 is fitted to the rear side of the circuit board 106 (in an electrically conductive or insulating manner) by means of a thermally conductive adhesive connection. In detail, the heat sink 108 comprises a pad composed of regularly arranged pins 1013 having the same height, said pad being placed on a plate 1012.

For fixing on a mounting surface, e.g. a wall, the heat sink 108 comprises holding lugs 1014. The arrangement shown here of the holding lugs 1014 in the center of the long edges 108*a* or of the longer side edges of the elongate heat sink 108 is particularly advantageous for two reasons: firstly, the distance from the heat sources (LEDs, electrical/electronic components) is then small. This results in a particularly high degree of heating of the holding lugs 1014, which provides for additional heat dissipation from the module 101 by thermal conduction via the holding lugs 1014 to the mounting surface. Secondly, for cooling by free convection at the heat sink 108, the long heat sink edges 108*a* afford a larger cross-sectional area for the air flowing through (better cooling), and an adverse influence of the holding lugs 1014 in this regard has a less pronounced effect than in the case of provision on the short edges 108*b* with a smaller cross-sectional area for the air. This leads to thermal properties of the heat sink 108 which depend to a lesser extent on the orientation of the heat sink 108 (e.g. vertical or horizontal) on a mounting surface than in the case of holding lugs 1014 arranged differently.

The length of the pins 1013 is chosen such that they project from the plate 1012 further toward the rear than the holding lugs 1014 (height difference preferably of 0.05 to 0.3 mm). This ensures the contact of one or more pins 1013 with the mounting surface and hence an additional heat dissipation by conduction via the bearing areas of the pins 1013 on the mounting surface, which is preferably composed of metal. The fixing of the heat sink 108 by means of the holding lugs 1014 is realized here by screws, the screw holes of which are illustrated in the holding lugs 1014 (not provided with reference signs).

For better heat dissipation, the heat sink 108 is surface-treated, e.g. by means of a powder coating or an anodization. This results in a higher thermal emittance than that of the raw material (better system heat dissipation by increased thermal radiation). At the same time, the coating protects the heat sink against harmful environmental influences. A light color with high light reflectance of the coating is advantageous in order to increase the optical properties in the diffusely reflective light box.

The heat sink 108 comprises a depression 1015 in the form of a bead on the short sides 108*b*. In combination with the cover 107, which comprises a bulge 1016 at the corresponding location, a guide channel is created for the cables 109. In the event of a tensile force on the cable 109 of arbitrary orientation (e.g. upward, downward, toward the right or toward the left), the force is transmitted through said channel to soldering locations of the cables 109 with the circuit board 106 in such a way that the force is directed only in a small, as far as possible insensitive angular range with respect to the surface of the circuit board. This prevents shear and peel forces on the soldering locations.

The cover 107 is composed of thermally resistant and UV-stable plastic. A light coloring is advantageous, combined with a reflectivity of more than 60% in the visible range of light in order to improve the optical properties of the module 101 in the light box. The cover 107 is shaped in such a way that it partly laterally conceals the heat sink 108 and thus increases the total reflectivity of the module 101. The cover 107 comprises cutouts 1017 embodied in such a way that the LEDs 102, 103, 104 can emit their light unimpeded in terms of location and angle. The cover 107 is fixed by means of a snap-action mechanism by means of plastic pins 1018 which are led through corresponding holes (not provided with reference signs) in the circuit board 106, 1010, 1011 and in the heat sink 108 and latch into place. The cover 107 additionally has the property that it does not close off the underlying interior space of the module 101 in an airtight manner, but rather allows moisture to enter and exit. The accumulation of condensation water is avoided in this way.

For protection against condensation water/corrosion and harmful gasses, the electrical contacts of the current-carrying parts on the circuit board 106, 1010 are coated with a lacquer layer. This reduces the risk of the formation of air clearances and creepage paths. In the embodiment shown, the lacquer exhibits fluorescent properties for quality inspection. The viscosity of the lacquer is preferably chosen such that it achieves a complete wetting of the contacts via the effect of capillary action. Viscosities in the range of 100-500 mPas are advantageous.

It goes without saying that the present invention is not restricted to the embodiments shown.

Thus, the driver circuit can be configured equivalently with other circuit elements, e.g. npn-transistors or other transistors instead of the pnp-transistors.

It is also possible to use other light sources instead of light-emitting diodes, e.g. discharge lamps or fluorescent tubes. The driver circuit can be designed in a suitable manner for driving the light source(s), e.g. also as a pulse-width-modulating driver.

Moreover, the driver circuit can be equipped with one or more detection elements for detecting a luminous flux or a luminous intensity which is emitted by the LED or the LED chain, and can correspondingly adapt the driver current.

Moreover, instead of a—single-colored or white—LED it is possible to use an LED cluster composed of a plurality of different-colored LEDs whose light is subjected to additive color mixing, e.g. an LED cluster composed of the primary colors RGB, e.g. RGGB, for additive color mixing to white.

The luminous chain can also comprise a plurality of strands (interconnected sets each comprising at least one light source and a current control circuit), wherein each strand in each case drives LEDs of one color, e.g. a luminous chain comprising four strands RGGB.

LIST OF REFERENCE SIGNS

1 Luminous chain
2 LED
3 Control circuit
4 Driver supply line
5 Driver supply line/light source line
6 Light source supply line
7 Combining node
8 Resistor
9a Resistor
9b Resistor
10a Transistor
10b Transistor
11 Diode
12 Luminous chain
13 Driver supply line
14 Contact
15 Bridge
101 Luminous module
102 Red LED
103 Blue LED
104 Green LED
105 Diffusing optical unit
106 Circuit board
107 Cover
108 Heat sink
108a Long edge
108b Short edge
109 Cable
1010 Dielectric
1011 Substrate
1012 Plate
1013 Pin
1014 Holding lug
1015 Depression
1016 Bulge
1017 Cutout
1018 Plastic pin
mi Luminous module
ni Luminous module
pi Luminous module
ri Luminous module
si Luminous module

The invention claimed is:

1. A luminous chain comprising a plurality of luminous modules, wherein at least two of the luminous modules comprise at least one set comprising at least one light source and one driver circuit for driving the at least one light source, and the driver circuits of one set of the respective luminous modules are electrically connected in parallel with one another, and the light sources of said one set of the respective luminous modules are electrically connected in series with one another, and the driver outputs of the driver circuits are combined at a node for jointly supplying current to all of the light sources of said one set.

2. A luminous module, in particular for use in a luminous chain as claimed in claim 1, comprising at least one continuous light source line with at least one interposed light source, in particular at least one light-emitting diode; at least one continuous light source supply line; at least one continuous driver supply line for operating at least one driver circuit for driving the at least one light source (2); wherein a driver circuit feeds at least one continuous driver supply line.

3. A luminous chain comprising a plurality of cascaded luminous modules as claimed in claim 2, in which, in at least one luminous module, the light source supply line and the light source line are electrically connected to one another.

4. The device as claimed in claim 1, in which the driver circuit is a current control circuit or a current stabilizer circuit.

5. The device as claimed in claim 2, in which the light source line corresponds to a supply line of the driver circuit.

6. The device as claimed in claim 5, in which the driver circuit is electrically connected by one of its supply inputs to a cathode side of the associated light source.

7. The device as claimed in claim 1, in which the driver circuit is connected to a dedicated driver supply line for each of its supply inputs.

8. The device as claimed in claim 1, in which each luminous module comprises a plurality of light sources per set, in particular two green LEDs.

9. The device as claimed in claim 1, in which each luminous module comprises a plurality of sets comprising at least one light source and one driver circuit for supplying current to the at least one light source.

10. The device as claimed in claim 9, in which at least three sets comprising at least one light source and one associated driver circuit are present, wherein the light sources of at least two sets are in each case of different colors with respect to one another.

11. The device as claimed in claim 10, in which the light sources of a luminous module emit at least colors which enable a white additive color mixing, in particular of the colors RGB, especially RGGB.

12. The device as claimed in claim 1, in which the luminous module comprises a heat sink.

13. A method for operating a luminous chain, wherein the luminous chain includes a plurality of luminous modules each comprising at least one set comprising at least one light source and a driver circuit for driving the at least one light source, wherein the driver circuits of one set of the respective luminous modules are supplied with current electrically in parallel, and the currents of the driver circuits of said one set of luminous modules for supplying the light sources are combined at a node, and the light sources of said one set of the respective luminous modules are supplied with the combined currents of the driver circuits electrically in series.

14. The device as claimed in claim 2, in which the driver circuit is a current control circuit or a current stabilizer circuit.

15. The device as claimed in claim 2, in which the light source line corresponds to a supply line of the driver circuit.

16. The device as claimed in claim 2, in which the driver circuit is connected to a dedicated driver supply line for each of its supply inputs.

17. The device as claimed in claim 2, in which each luminous module comprises a plurality of light sources per set, in particular two green LEDs.

18. The device as claimed in claim 2, in which each luminous module comprises a plurality of sets comprising at least one light source and one driver circuit for supplying current to the at least one light source.

* * * * *